US008689306B2

(12) United States Patent  (10) Patent No.: US 8,689,306 B2
Canard et al.  (45) Date of Patent: Apr. 1, 2014

(54) METHOD FOR THE UNIQUE AUTHENTICATION OF A USER BY SERVICE PROVIDERS

(75) Inventors: Sébastien Canard, Caen (FR); Eric Malville, Bayeux (FR); Jacques Traore, Saint Georges des Groseillers (FR); Stéphane Guilloteau, Douville En Auge (FR)

(73) Assignee: Orange, Paris (FR)

( * ) Notice: Subject to any disclaimer, the term of this patent is extended or adjusted under 35 U.S.C. 154(b) by 764 days.

(21) Appl. No.: 12/528,470

(22) PCT Filed: Feb. 25, 2008

(86) PCT No.: PCT/FR2008/050306
§ 371 (c)(1),
(2), (4) Date: Aug. 25, 2009

(87) PCT Pub. No.: WO2008/113951
PCT Pub. Date: Sep. 25, 2008

(65) Prior Publication Data
US 2010/0275009 A1  Oct. 28, 2010

(30) Foreign Application Priority Data

Feb. 28, 2007 (FR) ...................................... 07 53556

(51) Int. Cl.
*H04L 29/06* (2006.01)
(52) U.S. Cl.
USPC .............................................. 726/8; 713/182
(58) Field of Classification Search
USPC ................................................... 726/4, 6–8
See application file for complete search history.

(56) References Cited

U.S. PATENT DOCUMENTS

| 7,222,362 | B1 * | 5/2007 | Canetti et al. ..................... 726/5 |
| 7,584,363 | B2 * | 9/2009 | Canard et al. ................. 713/180 |
| 2004/0128558 | A1 * | 7/2004 | Barrett .......................... 713/202 |
| 2005/0005125 | A1 * | 1/2005 | Zhang et al. .................. 713/176 |
| 2006/0053296 | A1 * | 3/2006 | Busboom et al. ............. 713/182 |
| 2006/0129817 | A1 * | 6/2006 | Borneman et al. ............ 713/170 |
| 2006/0155993 | A1 * | 7/2006 | Busboon ....................... 713/169 |
| 2007/0101145 | A1 * | 5/2007 | Sachdeva et al. ............. 713/176 |
| 2008/0052227 | A1 * | 2/2008 | Canard et al. ................... 705/39 |
| 2008/0250248 | A1 * | 10/2008 | Lieber ........................... 713/183 |

OTHER PUBLICATIONS

X. Chen, "ID-based Restrictive Partially Blind Signatures and Applications" 2207, pp. 1-12 http://citeseerx.ist.psu.edu/viewdoc/versions?doi=10.1.1.76.1294.*

(Continued)

*Primary Examiner* — Jung Kim
*Assistant Examiner* — Carlos M De Jesus, Jr.
(74) *Attorney, Agent, or Firm* — Drinker Biddle & Reath LLP

(57) ABSTRACT

A method for unique authentication of a user including federating an identity of said user for said service provider and an identity of the user for an identity provider, the federating including the steps of generating a user alias for that service provider and sending said identity provider a masked alias deduced from said alias, the identity provider associating said masked alias for that service provider with the identity of the user for the identity provider and sending the user elements for calculation by the user of a signature of a message containing the non-masked alias calculating said signature and sending the service provider said message with said signature, and the service provider verifying said signature, authenticating the user, and associating said alias with the user's identity.

5 Claims, 4 Drawing Sheets

(56) References Cited

OTHER PUBLICATIONS

X. Chen, "ID-based Restrictive Partially Blind Signatures and Applications" 2207, pp. 1-12 http://citeseerx.ist.psu.edu/viewdoc/versions?doi= 10.1.1.76.1294.*

Martinet, Gwenaelle, "Cryptanalysis of a Partially blind signature Scheme or how to make $100 bills with $1 and $2 ones", 2006, pp. 1-6, http://link.springer.com/chapter/10.1007%2F11889663_15.*

Abe, Masayuki, "Provably Secure Partially Blind Signatures", 2000, pp. 271-286 http://link.springer.com/chapter/10.1007%2F3-540-44598-6_17.*

Chang, Chin-Chen, "A new desgin of efficient partially blind signature scheme" 2003, pp. 397-403, http://www.sciencedirect.com/science/article/pii/S0164121203002371.*

Cao, Tianjie, "A randomized RSA-based partially blind signature scheme for electronic cash", 2005, pp. 44-49, http://www.sciencedirect.com/science/article/pii/S0167404804001737.*

Maitland, Greg, "A provably Secure Restrictive Partially Blind signature Scheme", 2002, pp. 99-114, http://link.springer.com/chapter/10.1007%2F3-540-45664-3_7.*

Rivest, Ronald, "Pseudonym Systems", 2000, pp. 184-199, http://cs.brown.edu/~anna/papers/lrsw99.pdf.*

Recordon, David, "OpenID 2.0: A Platform for User-Centric Identity Management", 2006, pp. 11-15 http://dl.acm.org/citation.cfm?id=1179532.*

* cited by examiner

| S (signatory) | U (user) |
|---|---|
| Public key : $(p, q, g, g_1, g_2, g_3, h)$<br>Private key : $x$ | Public key : $(p, q, g, g_1, g_2, g_3, h)$<br>Visible part : $M$<br>Concealed part : $m \parallel m^*$ |
|  | - choose $v, s \in [1, q-1]$<br>- calculate $m = g_2^v \bmod p$<br>$m_{masked} = g_2^v g^s \bmod p$<br>$m_0 = g_1^{H_1(M)} \times m_{masked} \times g_3$<br>$P_1 =$ proof of knowledge of representation of $m_{masked} = g_2^v g^s$ in the base $(g_2, g)$. |
| $\xleftarrow{m_{masked}, M, P_1}$ | |
| verify $P_1$. If verification is conclusive :<br>- generate at random an integer $\omega \in [1, q-1]$<br>- calculate $m_0 = g_1^{H_1(M)} \times m_{masked} \times g_3$<br>- calculate $a_0 = g^\omega \bmod p$, $b_0 = m_0^\omega \bmod p$ and $z_0 = m_0^x \bmod p$ | |
| $\xrightarrow{a_0, b_0, z_0}$ | |
|  | - generate at random $u, v \in [0, q-1]$<br>- calculate $a = a_0^u g^v \bmod p$<br>$b = b_0^u m_0^v / a^s \bmod p$<br>$z = z_0 / h^s \bmod p$<br>$c = H(M \parallel m^* \parallel m \parallel z \parallel a \parallel b)$<br>$c_0 = c/u \bmod q$ |
| $\xleftarrow{c_0}$ | |
| - calculate $r_0 = \omega - c_0 x \bmod q$ | |
| $\xrightarrow{r_0}$ | |
|  | - verify that : $g^{r_0} h^{c_0} = a_0 \bmod p$<br>$m_0^{r_0} z_0^{c_0} = b_0 \bmod p$<br>- calculate $r = u r_0 + v \bmod q$<br>and proof $P_2$ of knowledge of the discrete logarithm of $m$ to base $g_2$<br>Sign : $\sigma = (z, c, r)$ with $P_2$ |

FIG. 5

METHOD FOR THE UNIQUE AUTHENTICATION OF A USER BY SERVICE PROVIDERS

CROSS-REFERENCE TO RELATED APPLICATIONS

This application is the U.S. national phase of the International Patent Application No. PCT/FR2008/050306 filed Feb. 25, 2008, which claims the benefit of French Application No. 07 53556 filed Feb. 28, 2007, the entire content of which is incorporated herein by reference.

FIELD OF THE INVENTION

The present invention relates to a method for the unique authentication of a user by at least one service provider.

BACKGOUND OF THE INVENTION

The invention finds one particularly advantageous application in the field of unique authentication systems enabling a user who uses a plurality of identities with a plurality of service providers to federate their identities, i.e. to set up logical links between them, and to use a single sign-on (SSO) unique authentication service to access the service providers without having to be authenticated more than once.

The standard authentication mechanisms on which the present invention relies assume that the user has previously opened an account with the identity provider, and with each of the service providers, identified by respective local identities (user@idp, and user@sp), by registering with the respective user names bases, each of which user names can be, depending on the policies of the identity provider, and of each of the service providers, either the (officially certified) name of the user or a pseudonym; authentication by an IdP or an SP entails, for the user, proving that they are the entity corresponding to the user name in which they opened an account and, for the IdP or the SP, referring after verification to the local identity associated with that user.

Already known in the art are a plurality of systems offering SSO functions employing a mechanism whereby a user is authenticated a first time by an IdP (identity provider) and accesses Internet service providers (SP) without having to be authenticated again.

A first family of SSO solutions uses a unique local identity shared by the IdP and the SPs. SSO systems such as Tivoli Access Manager from IBM rely on that type of approach. A drawback of those systems is that the IdP and the SPs, which hold the unique identity of the user, can correlate their customer databases and therefore violate the privacy of users.

A second family of SSO solutions uses identity federation. The user has different identities for the IdP and the SPs and establishes logical links between them so that in the end the combination constitutes a logically unique but physically distributed identity. Standards such as Liberty from Liberty Alliance or SAML from OASIS define interservice identity federation and SSO mechanisms that rely on identity federation.

The Liberty Alliance and OASIS mechanisms enable users to federate their identities dynamically and online. They also enable an SP to obtain a certified identity from an IdP and thus spare a user wishing to consume a service from performing a new authentication stage.

When a user connects for the first time to an IdP in order to be authenticated by an SP, that user is offered the option of federating the SP identity with the IdP identity. In contrast to the approach adopted by products such as Tivoli Access Manager from IBM, the Liberty and SAML standards do not require IdPs to supply a user's local identity. To the contrary, IdPs can instead provide a reference associated with the user and known as the federation alias, the IdP supplying a different federation alias for each SP.

In identity federation, each IdP and SP entity creates for each user a table of the correspondences between the user's local identity and the respective aliases used by each other entity, as shown in FIG. 1, which is a diagram representing the Liberty and SAML identity federation model.

The identity federation process offered by Liberty Alliance and OASIS is as follows:

1. A user accesses a service of a service provider $SP_A$.
2. The service provider $SP_A$ redirects the user to the identity provider IdP and has the user send the IdP an authentication request signed by $SP_A$.
3. The identity provider IdP verifies the signature of the authentication request and authenticates the user in order to deduce their local identity (user@idp). If the identity provider IdP finds that the local identity (user@idp) is not yet federated with the user's identity (user@spa) for the service provider $SP_A$, it generates a federation alias (123) and associates it with the user's local identity (user@idp). The identity provider IdP generates and signs an authentication response. This authentication response contains the federation alias (123) instead of the user's local identity (user@idp).
4. The identity provider IdP redirects the user to the service provider $SP_A$, sending it the authentication response.
5. The service provider $SP_A$ receives the authentication response, verifies the signature, and extracts the federation alias (123). If it finds no local identity that corresponds to this federation alias, it prompts the user to federate the local identity with the IdP identity. The service provider $SP_A$ authenticates the user, deduces the local identity (user@spa), and associates the federation alias (123) with that local identity.

Thus the user's IdP identity (user@idp) is federated with their $SP_A$ identity (user@spa) by way of the federation alias (123).

The same procedure is applied to federate the user's IdP identity (user@idp) with that user's identity (user@spb) for another service provider $SP_B$ by way of the federation alias (456).

SSO unique authentication is possible once the user's identities for the identity provider and each service provider have been federated. From the user's point of view, SSO authentication is effected when they are authenticated by an identity provider and access a plurality of affiliated service providers without having to be authenticated again. This advantage is obtained after federation of the user's local identities between the identity provider and the various service providers. The SSO protocol differs from the identity federation protocol in that, in above step 5, a service provider SP does not need to authenticate a user because it can automatically determine the user's identity user@sp from the federation alias.

The Liberty and OASIS standards therefore offer an SSO mechanism guaranteeing a first level of privacy. In the identity federation mechanism that they propose, an identity provider provides a different federation alias for each service provider. The service providers can therefore not use those aliases to correlate their customer databases.

In contrast, the identity provider has all the federation aliases and therefore sufficient and necessary information to be able to correlate the customer databases. Such fraudulent correlation could be effected at the initiative either of the identity provider itself or of a third party who has succeeded in accessing the data held by the identity provider.

SUMMARY OF THE INVENTION

The present invention therefore proposes a method for the unique authentication of a user by at least one service provider, said method including a preliminary identity federation stage of federating an identity of said user for said service provider and an identity of said user for an identity provider. This method is noteworthy in that said preliminary identity federation stage includes the steps of:

the user generating a user alias for that service provider and sending said identity provider a masked alias deduced from said alias;

the identity provider associating said masked alias for that service provider with the identity of the user for the identity provider and sending the user elements for calculation by the user of a signature of a message containing the non-masked alias;

the user calculating said signature and sending the service provider said message with said signature; and the service provider verifying said signature, authenticating the user, and associating said alias with the user's identity for the service provider.

By means of the invention, a user can be authenticated by at least one service provider by federating the identities of that user for the service provider and for an identity provider without the service provider or the identity provider holding information enabling them to correlate their customer databases.

Accordingly, like the Liberty and SAML standards, the method of the invention results in the same user being known by different aliases to different service providers, which prevents any correlation of customer bases between service providers, but also the alias by which a user is known to the identity provider for a given service provider (i.e. a masked alias) is different from the corresponding alias for the service provider, which prevents any possibility of correlation of customer bases at the initiative of the identity provider.

The invention therefore relates also to a federation table accessible to an identity provider and associated with the identity of a user registered with said identity provider, said federation table being noteworthy in that it matches with at least one service provider a respective masked alias obtained by masking an alias associating said identity provider with the identity of said user for said service provider.

In other words, in the context of the invention, the federation table is managed by users themselves, whereas under the Liberty and SAML standards it is managed by the identity provider. The invention therefore provides a second level of privacy.

Once the preliminary stage of identity federation has been effected, the user can submit a service request to a service provider using an authentication stage of the invention and comprising the following steps:

the identity provider authenticating the user for said service provider;

the identity provider searching for the masked alias for said service provider associated with the identity of said user for said identity provider and sending the user elements for calculation by the user of a signature of a message containing the non-masked alias;

the user calculating said signature and sending the service provider said message with said signature; and the service provider verifying said signature, recovering the user's identity for the service provider from the alias, and providing the service requested by the user.

According to particular features, said elements provided by the identity provider represent a partially blind signature of a message containing said masked alias. In other words, in this implementation, after blind signing of the masked alias by the IdP and unmasking of the alias by the user, the user advantageously obtains the same signature as the IdP would have been able to produce based on the non-masked alias.

In particular, said preliminary identity federation stage includes the steps of:

the user receiving from the service provider non-confidential data M and, optionally, confidential data $m^*$, then generating an alias m of the user for that service provider, and sending said identity provider said non-confidential data M, said alias m in masked form: $m_{masked}=m \cdot g^s$ mod p, where g and p are public elements and s an element chosen by the user, and, where appropriate, said confidential data $m^*$, in masked form;

the identity provider associating said masked alias $m_{masked}$ for this service provider with the identity of the user for the identity provider, calculating the elements $m_0 = g_1^{H_1(M)} \cdot m_{masked} \cdot g_3$ and $z_0 = m_0^x$ mod p, where $g_1$ and $g_3$ are public elements, x a private key of the identity provider associated with the public key $h=g^x$ mod p, and $H_1$ a hashing function, proving interactively with the user that the discrete logarithm of h to base g is equal to that of $z_0$ to base $m_0$, and sending the user the partially-blind signature of a message msg=M∥m, or, where appropriate, msg=M∥m∥$m^*$;

the user unmasking said partially blind signature and sending the service provider the unmasked signature with said message msg, and the service provider verifying the signature, extracting the alias m from the message msg, authenticating the user and associating said alias m with the identity of the user for the service provider.

It should be noted that in this implementation the interactive proof that the discrete logarithm of h to base g is equal to that of $z_0$ to base $m_0$ corresponds to the elements for calculating the signature that are sent to the user (see above).

Likewise, the user can, in the event of receiving a service request to a service provider after said identity federation stage, execute an authentication stage including the steps of:

the user receiving from the service provider non-confidential data M and, optionally, confidential data $m^*$, being authenticated by said identity provider for said service provider, and sending the identity provider said non-confidential data M and, where appropriate, said confidential data $m^*$ in masked form;

the identity provider searching for the masked alias $m_{masked}$ for this service provider associated with the identity of the user for the identity provider, calculating the elements $m_0=g_1^{H_1(M)} \cdot m_{masked} \cdot g_3$ and $z_0=m_0^x$ mod p, where $g_1$ and $g_3$ are public elements, x a private key of the identity provider associated with the public key $h=g^x$ mod p, and $H_1$ a hashing function, proving interactively with the user that the discrete logarithm of h to base g is equal to that of $z_0$ to base $m_0$, and sending the user the partially-blind signature of a message msg=M∥m, or, where appropriate, msg=M∥m∥$m^*$;

the user unmasking said partially-blind signature and sending the service provider the unmasked signature with said message msg; and the service provider verifying said signature, recovering the user's identity for the service provider from the alias m extracted from the message msg, and providing the service requested by the user.

The invention is also directed to:

non-removable data storage means containing computer program code instructions for executing the steps of any of the methods briefly explained above for unique authentication of a user by at least one service provider;

partially or totally removable data storage means containing computer program code instructions for executing the steps of any of the methods briefly explained above for unique authentication of a user by at least one service provider; and a computer program including instructions such that, when said program controls a programmable data processing device, said instructions cause said data processing device to execute any of the methods briefly explained above for unique authentication of a user by at least one service provider.

The advantages offered by these data storage means and this computer program are essentially the same as those offered by said method.

BRIEF DESCRIPTION OF THE DRAWINGS

The following description with reference to the appended drawings, provided by way of non-limiting example, explains clearly in what the invention consists and how it can be reduced to practice.

FIG. 5 is a diagram of a partially-blind signature scheme used by the invention.

DETAILED DESCRIPTION

The unique authentication method of the invention includes a first stage, known as the identity federation stage, which associates the identity of a user for an identity provider and the identities of the same user for service providers. Following this preliminary identity federation stage, any request from the user to access a service is authenticated using the identity federation established in this way.

Figure 1:
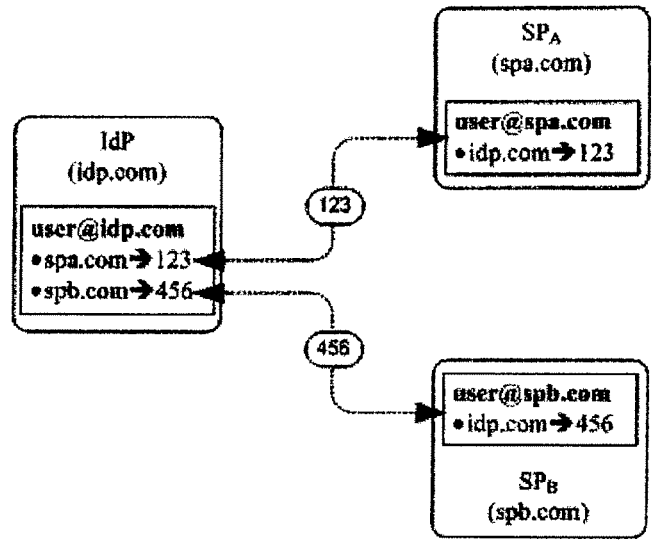
FIG. 1, commented on above, is a diagram representing the Liberty and SAML identity federation model.
Figure 2:
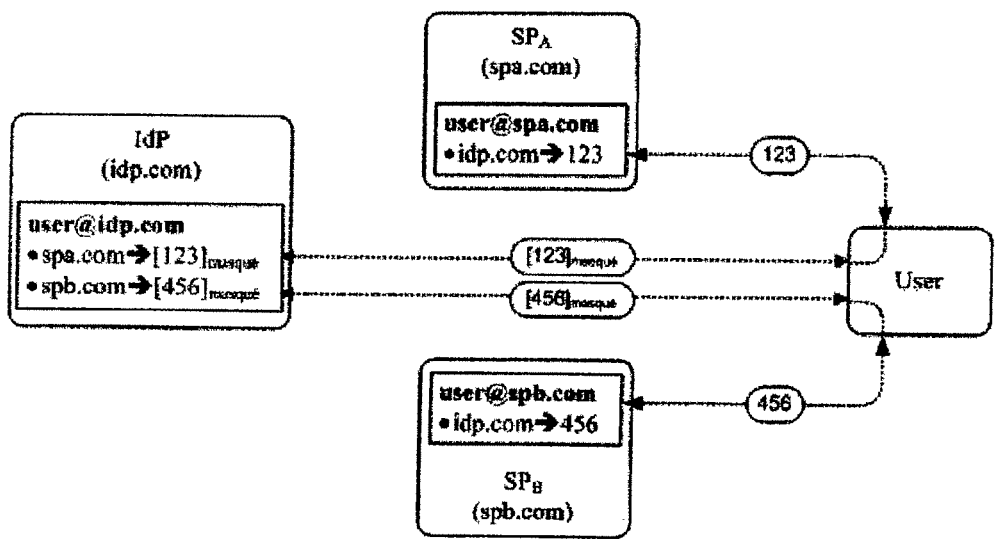
FIG. 2 is a diagram representing an identity federation model of the invention.

FIG. 2 shows a model for identity federation between a user's identity (user@idp) for an identity provider IdP and said user's local identities (user@spa) and (user@spb) for respective service providers $SP_A$ and $SP_B$.

Figure 3:
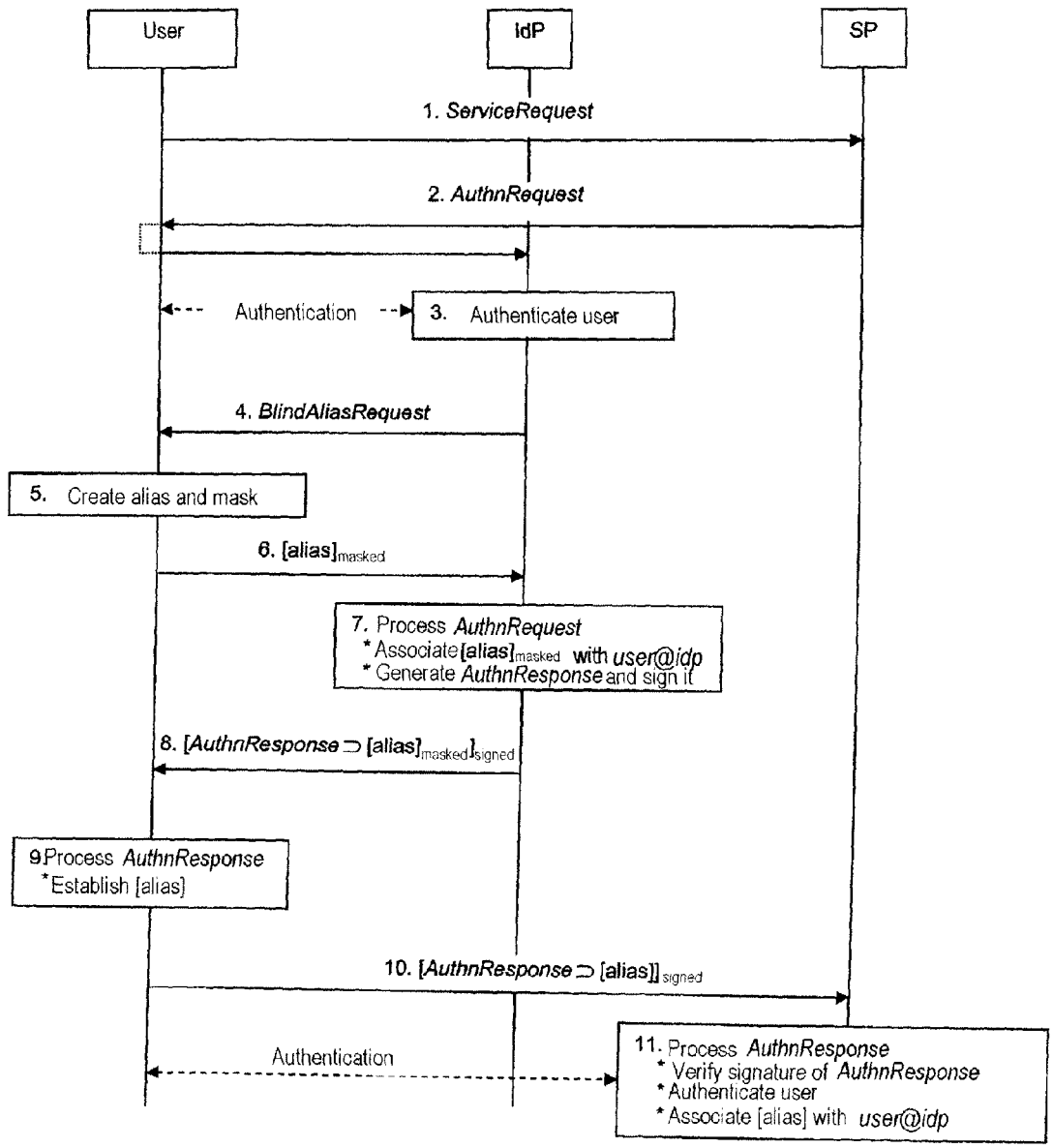
FIG. 3 is a diagram representing the steps of an identity federation mechanism using the FIG. 2 model.

FIG. 3 represents an identity federation mechanism based on the FIG. 2 model. To simplify the description, only one service provider SP is considered, on the understanding that this scheme can be immediately extended to any number of service providers.

The steps of the FIG. 3 mechanism are as follows:

1. The user accesses a service of the service provider SP.
2. The service provider SP redirects the user to the identity provider IdP and has the user send the IdP an authentication request (AuthnRequest) signed by SP.
3. The identity provider IdP verifies the signature of the authentication request (AuthnRequest) and authenticates the user.
4. If the identity provider IdP finds that the identity (user@idp) of the user is not federated with any identity for that service provider, it sends the user an alias generation request.
5. The user's browser generates a federation alias [alias] specific to the service provider SP and conceals it in a masked alias ($[alias]_{masked}$), the masking process using a non-revocable blind signature scheme described in detail below, for example.
6. The user's browser sends the masked federation alias ($[alias]_{masked}$) to the identity provider IdP.
7. The identity provider IdP associates the masked alias ($[alias]_{masked}$) with the local identity (user@idp) and generates elements enabling the user to calculate a signature for a message containing the non-masked alias [alias].
8. The identity provider IdP sends said elements to the user.
9. The user's browser establishes the federation alias [alias] (i.e. unmasks $[alias]_{masked}$).
10. The user sends the service provider SP an authentication response (AuthnResponse) including a message containing the non-masked alias [alias] and an associated signature σ calculated from the elements received from the identity provider IdP.
11. The service provider SP receives the authentication response (AuthnResponse), verifies the signature σ, and extracts from it the federation alias [alias]. If it finds no local identity that is associated with that federation alias, it prompts the user to federate their local identity (user@sp) with their identity for the identity provider IdP. The service provider SP authenticates the user, deduces their local identity (user@sp), and associates the federation alias [alias] with that local identity.

The identity (user@idp) of the user for the identity provider is then federated with their identity (user@sp) for the service provider.

FIG. 2 provides one example of application of the identity federation mechanism that has just been described.

The aliases [123] and [456] are associated with the respective local identities (user@spa) and (user@spb) of the user for the respective service providers $SP_A$ and $SP_B$. For the identity provider IdP, the user's identity (user@idp) is associated with the masked aliases $[123]_{masked}$ and $[456]_{masked}$ for the respective service providers $SP_A$ and $SP_B$. The relationship between the aliases and the masked aliases is provided by the user. It is therefore impossible for the identity provider IdP or the service providers $SP_A$ and $SP_B$ to correlate their customer bases.

Figure 4:
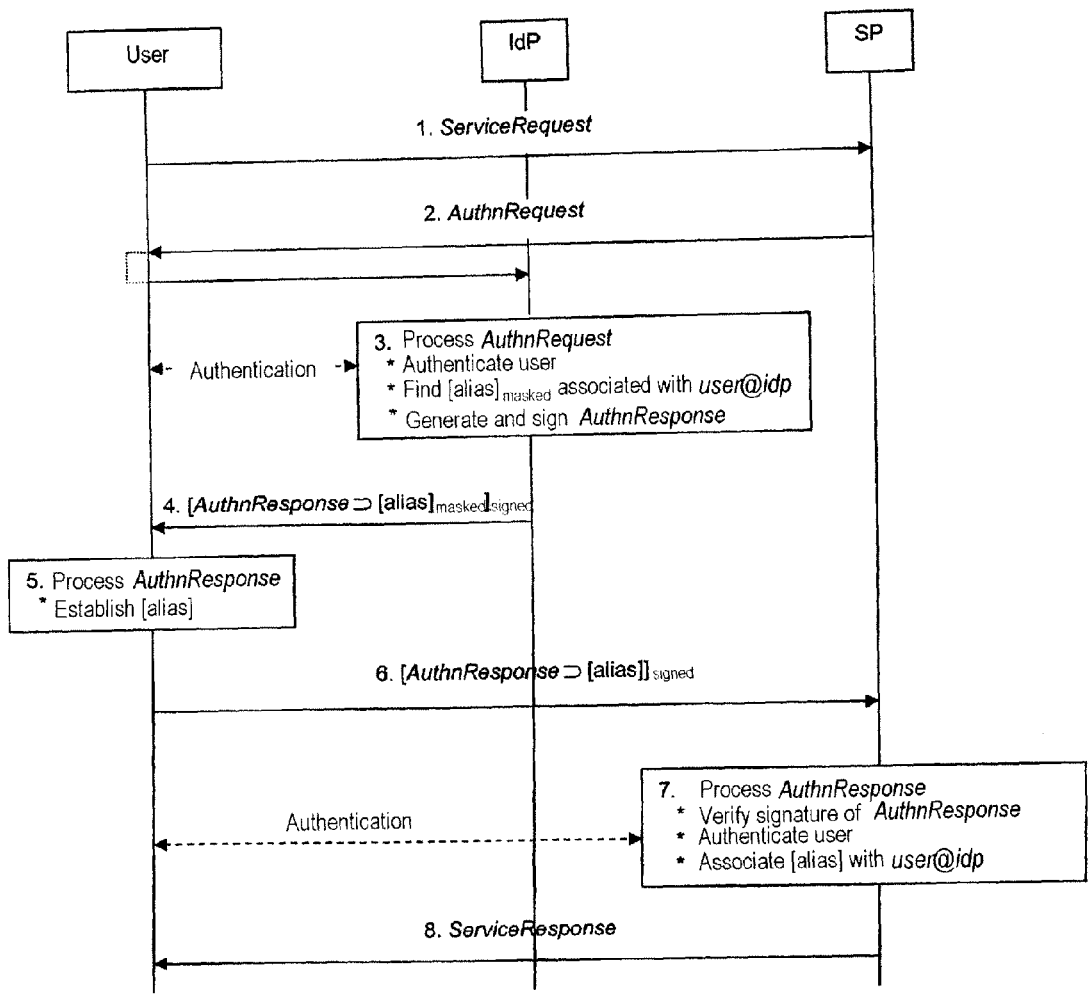
FIG. 4 is a diagram representing the steps of a unique authentication mechanism using the FIG. 2 model.

FIG. 4 shows a user authentication mechanism that is used in the event of a request to access a service of a service provider SP after the user's identities for the identity provider IdP and the service provider SP have been federated.

This mechanism is as follows:

1. The user accesses a service of the service provider SP.
2. The service provider SP redirects the user to the identity provider IdP and has the user send the IdP an authentication request (AuthnRequest) signed by SP.
3. The identity provider IdP verifies the signature of the authentication request (AuthnRequest) and authenticates the user. It recovers the masked federation alias ($[alias]_{masked}$) associated with the user's identity (user@idp) for this service provider. It generates elements enabling the user to calculate a signature for a message containing the non-masked alias [alias].
4. The identity provider IdP sends said elements to the user.
5. The user's browser establishes the federation alias [alias] (i.e. unmasks $[alias]_{masked}$).
6. The user sends an authentication response (AuthnResponse) including a message containing the non-masked alias

[alias] and a signature σ of that message calculated from the elements received from the identity provider IdP.

7. The service provider receives the authentication response (AuthnResponse), verifies the signature σ and extracts from it the federation alias [alias]. It recovers from this alias the user's local identity (user@sp).

8. The service provider provides the service requested by the user.

The use of these mechanisms should preferably conform to a plurality of beneficial security and privacy constraints:
- the federation aliases must be different from one service provider to another;
- for a given service provider, the authentication responses must contain the same federation alias unless the user, the identity provider and/or the service provider explicitly requests this; and
- the user must be able to verify that an authentication response does not contain an alias addressed to a service provider other than the provider that signed the authentication request.

One particular implementation of the identity federation and authentication mechanisms described above is described below with reference to a partially-blind signature scheme.

One particular feature of such a scheme is that the signatory of a message, namely the identity provider in the situation of the invention, can sign a message even though it knows only part of the message. The message to be signed is therefore in two parts: a first part that is visible to the signatory and a second part that is concealed from the signatory. Accordingly, in the context of the invention, the identity provider is required to sign a message containing the federation alias of the user although it does not know it, the user supplying it with only the masked alias.

This scheme also constrains the user to have the identity provider partially blindly sign the message containing the federation alias, requiring them always to use the same alias masking procedure, the masked federation alias given to the identity provider having to be identical from one authentication request to another, to prevent fraud on the user side.

The following conventions are used in the remainder of the description:
- [a, b] designates the set of integers greater than or equal to a and less than or equal to b; accordingly, [1, 3]={1, 2, 3};
- operations of multiplication, addition and exponentiation are carried out in modular fashion, i.e. by retaining only the remainder of the integer division of the result by a given modulus; the calculation of x modulo p (i.e. the remainder from the Euclidean division of x by p) is denoted x mod p or x [p];
- $Z_n$ denotes the set of residues modulo n, i.e. the range [0, n−1]={0, 1, 2, . . . , n−1}, where n is a strictly positive integer;
- $Z_n^*$ denotes the set of elements of $Z_n$ that are prime with n (in other words, the elements that have a reciprocal modulo n); accordingly, $Z_6^* = \{1, 5\}$;
- {0, 1} denotes the set of character strings consisting of the characters 0 and 1;
- $\{0, 1\}^l$ denotes the subset of $\{0, 1\}^*$ formed by strings of length l;
- the symbol ∥ denotes concatenation;
- |x| denotes the size of the integer x expressed in bits;
- the notation a|b signifies that the integer a divides the integer b;
- the notation $x \in_R E$ signifies that the element x is chosen at random in the finite set E; and

- the notations "$\xrightarrow{m}$" and "$\xleftarrow{m}$" symbolize the transmission of a message m from one entity to another.

The partially blind signature scheme used in the implementation described here is derived from a simple (i.e. non-blind) signature scheme using the Chaum-Pedersen protocol (see D. Chaum and T. Pedersen, "*Wallet databases with observers*", Proceedings of EUROCRYPT '92, Lecture Notes in Computer Science, vol. 740, Springer-Verlag, pages 89 to 105).

The Chaum-Pedersen (below SIGNUM) simple signature scheme is as follows:

The public parameters of this signature scheme are two prime numbers p and q such that q|(p−1) and four elements of a cyclic group $G_q$ of order q, namely g, $g_1$, $g_2$, and $g_3$. The private key of the signatory is an integer $x \in [1, q-1]$ and its public key is the element $h=g^x \mod p$. Below, H and $H_1$ designate two collision-resistant hashing functions (for example SHA-256).

To sign a message msg of the form M∥m∥m*, where M and $m^* \in \{0, 1\}^*$ and m is an element of $G_q$ whose discrete logarithm to base $g_2$ is known to the signatory S, the signatory S proceeds as follows:

it generates at random an element $\omega \in [1, q-1]$;
it calculates:

$$z=(g_1^{H_1(M)} \cdot m \cdot g_3)^x \mod p;$$

$$c=H(M\|m^*\|m\|z\|g^\omega\|(g_1^{H_1(M)} \cdot m \cdot g_3)^\omega); \text{ and}$$

$$r=\omega-cx \mod q;$$

it generates non-interactively for the signature verification entity a proof P that it knows the discrete logarithm of m to base $g_2$ without divulging the value of that discrete logarithm to the verification entity.

The signature σ of msg includes the triplet (z, c, r) and the proof P. For details of zero-knowledge proof protocols see ISO/IEC standards 9798-5 and 14888-2.

The verification entity considers the signature σ as a valid signature of the message msg if P is valid and if $c=H(M\|m^*\|z\|g^r H^c\|(g_1^{H_1(M)} \cdot m \cdot g_3)^r \cdot z^c)$.

This simple signature scheme can be transformed into a partially-blind signature scheme shown in FIG. 5 (BlindSig below).

As for the SIGNUM scheme, the public parameters of the BlindSig scheme are two prime numbers p and q such that q|(p−1) and four elements from a cyclic group $G_q$ of order q, namely g, $g_1$, $g_2$, and $g_3$. The private key of the signatory is an integer $x \in [1, q-1]$ and its public key is the element $h=g^x \mod p$. Below, H and $H_1$ designate two collision-resistant hashing functions (for example SHA-256).

To obtain a partially-blind signature of a message msg=M∥m∥m*, where M designates a part intended to be visible to the signatory and m and m* parts intended to be concealed from the signatory, the user U initially masks the message m. To this end, the user draws at random an element $s \in [1, q-1]$, calculates $m_{masked}=m \cdot g^s \mod p$, and sends this value to the signatory S. The signatory calculates $m_0=g_1^{H_1(M)} \cdot m_{masked} \cdot g_3$ and $z_0=M_0^x \mod p$, and (using a question $c_0$ and response $r_0$ mechanism) proves interactively with the user U that the discrete logarithm of h to base g is equal to that of $z_0$ to base $m_0$. From this proof, the user U can recover the Chaum-Pedersen signature σ=(z, c, r) from the message msg and the proof $P_2$ that it knows the discrete logarithm of m to base $g_2$.

It is easy to verify that σ is a valid signature of msg according to the SIGNUM algorithm.

The identity federation mechanism using the BlindSig scheme described above is then as follows:

1. The user accesses a service of the service provider SP.
2. The service provider SP redirects the user to the identity provider IdP and has the user send the IdP an authentication request (AuthnRequest) signed by SP.

This request contains information in two categories.

A first category concerns information, such as the identifier of the provider or the authentication level requested, that, even in the event of collusion, would not allow the identity provider IdP and the service provider SP to correlate their customer bases. Information in this category is grouped in the part M of the message msg that must be signed partly blind by the identity provider IdP.

A second category concerns information, such as the request identifier, or even the date of the request, which, to the contrary, would enable the identity provider IdP and the service provider SP to correlate their customer bases. Information in this category is grouped in the part m* of the message msg.

3. The identity provider IdP verifies the signature of the authentication request and authenticates the user U.
4. If the identity provider IdP finds that the identity (user@idp) is not federated with any identity for the service provider SP, it sends the user U an alias federation request.
5. The browser of the user U generates at random two integers $\upsilon \in [1, q-1]$, calculates the federation alias ([alias]= $m = g_2^\upsilon$ mod p) specific to the service provider SP, and then masks it as described above:

$$[alias]_{masked} = m_{masked} = g_2^\upsilon \cdot g^s \bmod p$$

6. The user's browser sends the identity provider IdP the masked federation alias ([alias]$_{masked}$) with proof $P_1$ that it knows the representation of [alias]$_{masked}$=$m_{masked}$=$g_2^\upsilon \cdot g^s$ mod p in the base ($g_2$, g).
7. If the proof $P_1$ is valid, the identity provider IdP associates the masked alias ([alias]$_{masked}$) with the user's local identity (user@idp). The IdP provider and the user U then execute the BlindSig protocol, the identity provider IdP using as input M and [alias]$_{masked}$ and the user U using as input M, [alias]$_{masked}$ and m*. On completion of this protocol, the user U calculates a signature σ of the message msg=M||m||m*=M[alias]||m* from the elements received from the identity provider IdP that (partly blindly) signed the message.
8. The user U sends the service provider SP an authentication response (AuthnResponse) containing the message msg and the signature σ.
9. The service provider SP receives the authentication response (AuthnResponse), verifies the signature σ of the message msg, verifying in particular that it does relate to a request identifier that it recently generated, and extracts from it the federation alias ([alias]). If it finds no local identity that is associated with this federation alias, it prompts the user to federate their local identity (user@sp) with their identity for the identity provider IdP. The service provider SP authenticates the user, deduces their local identity (user@sp) and associates the federation alias ([alias]) with that entity.

The identity (user@idp) of the user for the identity provider is then federated with their identity (user@sp) for the service provider.

The authentication mechanism in the event of a service request after the identity federation stage described above is then as follows:

1. The user U accesses a service of the service provider SP.
2. The service provider SP redirects the user U to the identity provider IdP and has the user send the IdP an authentication request (AuthnRequest) containing a signature by the service provider SP of the message M defined above.
3. The identity provider IdP verifies the signature of the authentication request and authenticates the user U. It recovers the masked federation alias ([alias]$_{masked}$) associated with the user's identity (user@idp) for this service provider. The identity provider IdP and the user U then execute the BlindSig protocol, the identity provider IdP using as input M and [alias]$_{masked}$ and the user U using as input M, [alias]$_{masked}$ and m*. On completion of this protocol, the user U calculates a signature σ of the message msg=M||m||m*=M[alias]||m* from the elements received from the identity provider IdP that (partly blindly) signed the message.
4. The user U sends the service provider SP an authentication response (AuthnResponse) containing the message msg and the signature σ.
5. The service provider SP receives the authentication response (AuthnResponse), verifies the signature σ of the message msg, verifying in particular that it relates to a request identifier that it recently generated, and extracts from it the federation alias ([alias]), from which it recovers the user's local identity (user@sp).
6. The service provider SP provides the service requested by the user U.

The invention claimed is:

1. A computer-based method for unique authentication of a user by at least one service provider, said method including a preliminary identity federation stage of federating an identity of said user for said service provider and an identity of said user for an identity provider, wherein said preliminary identity federation stage comprises the steps of:
   a computing device of the user generating a non-masked user alias for that service provider and sending said identity provider a masked user alias deduced from said user alias;
   a computing device of the identity provider associating, using a processor, said masked user alias for that service provider with the identity of the user and sending elements to the user that are based on a message containing the masked user alias;
   the computing device of the user unmasking the masked user alias to get the non-masked user alias;
   the computing device of the user calculating a signature of a message containing the non-masked user alias and sending the service provider said message with said signature; and
   a computing device of the service provider verifying said signature, authenticating the user, and associating said non-masked user alias with the user's identity for the service provider;
   wherein said elements provided by the identity provider represent a partially blind signature of the message containing said masked user alias and the partially blind signature is masked.

2. A method according to claim 1, further comprising, in the event of a request for service to the service provider after said preliminary identity federation stage, an authentication stage including the steps of:
   the identity provider authenticating the user for said service provider;
   the identity provider searching for the masked user alias for said service provider associated with the identity of said user for said identity provider and sending elements to the user;
   the user calculating a signature of a message containing the non-masked user alias and sending the service provider said message with said signature; and the service provider verifying said signature, recovering the user's identity for the service provider from the user alias, and providing the service requested by the user.

3. A method according to claim 1, wherein said preliminary identity federation stage comprises the steps of:
by a computing device of the user:
receiving from the service provider, received data that is at least one of non-confidential data M and confidential data m*,
generating a user alias m of the user for that service provider, and sending said identity provider:
said non-confidential data M, when said received data comprises said non-confidential data M,
said user alias m in masked form: $m_{masked} = m \cdot g^s$ mod p, where g and p are public elements and s an element chosen by the user, and,
said confidential data m*, in masked form, when said received data comprises said confidential data m*;
by a computing device of the identity provider:
associating said masked user alias $m_{masked}$ for this service provider with the identity of the user for the identity provider,
calculating the elements $m_0 = g_1^{H_1(M)} \cdot m_{masked} \cdot g_3 m_0 = g_1^{H_1(M)} \cdot m_{masked} \cdot g_3$ and $z_0 = m_0^x$ mod p, where $g_1$ and $g_3$ are public elements, x is a private key of the identity provider associated with the public key $h = g^x$ mod p, and $H_1$ a hashing function,
proving interactively with the user that the discrete logarithm of h to base g is equal to that of $z_0$ to base $m_0$, and
sending the user the partially-blind signature of a message msg=M∥m for non-confidential data, and msg=M∥m∥m* for confidential data;
the method further comprising:
by the computing device of the user, unmasking said partially blind signature and sending the service provider the unmasked signature with said message msg; and
by the computing device of the service provider, verifying the signature, extracting the user alias m from the message msg, authenticating the user, and associating said unmasked user alias m with the identity of the user for the service provider.

4. A method according to claim 3, further comprising, in the event of a request for service by the service provider after said preliminary identity federation stage, an authentication stage including the steps of:
the user receiving from the service provider at least one of non-confidential data M and confidential data m*, being authenticated by said identity provider for said service provider, and sending the identity provider said non-confidential data M, if present, and said confidential data m*, if present, in masked form;
the identity provider searching for the masked user alias $m_{masked}$ for this service provider associated with the identity of the user for the identity provider, calculating the elements $m_0 = g_1^{H_1(M)} \cdot m_{masked} \cdot g_3$ and $z_0 = m_0^x$ mod p, where $g_1$ and $g_3$ are public elements, x is a private key of the identity provider associated with the public key $h = g^x$ mod p, and $H_1$ a hashing function, proving interactively with the user that the discrete logarithm of h to base g is equal to that of $z_0$ to base $m_0$, and sending the user the partially-blind signature of a message msg=M∥m, or, where appropriate, msg=M∥m∥m*;
the user unmasking said partially-blind signature and sending the service provider the unmasked signature with said message msg; and
the service provider verifying said signature, recovering the user's identity for the service provider from the unmasked user alias m extracted from the message msg, and providing the service requested by the user.

5. A non-transitory computer-readable storage medium having a computer program recorded thereon, the computer program including instructions that cause a data processing device to execute a method according to claim 1 when executed on the data processing device.

* * * * *